Patented Dec. 28, 1937

2,103,976

UNITED STATES PATENT OFFICE 2,103,976

PRODUCTION OF MAGNESIUM FROM MAGNESIFEROUS RAW MATERIALS BY THERMAL REDUCTION

Robert Suchy and Hellmuth Seliger, Bitterfeld, Germany, assignors, by mesne assignments, to Magnesium Development Corporation, a corporation of Delaware No Drawing. Application November 12, 1936, Serial No. 110,482. In Germany September 23, 1936

5 Claims. (Cl. 75—67)

The present invention relates to improvements in the production of magnesium from magnesiferous raw materials by thermal reduction, particularly with the aid of silicon as a reducing agent.

In processes for the thermal reduction of magnesiferous raw materials such as magnesite or dolomite with the aid of silicon, at temperatures below the melting point of the reaction residue, be it under atmospheric or only moderately reduced pressure in an atmosphere of hydrogen, or under a high vacuum, and particularly when the reaction mixture is employed in the form of briquetted moulded bodies, it has been observed that the speed of the reaction does not remain uniform, but diminishes progressively as the reaction proceeds. Even an increase of the temperature of the reaction mixture during the later stages of the reaction does not result in an appreciable acceleration while at the same time involving the risk that parts of the reaction mixture and/or of the residue may become heated above their melting temperature, which is undesirable.

It has now been ascertained that an addition to the reaction mixture of the fluorides of the alkali and alkaline earth metals in comparatively small proportions leads to a substantial acceleration of the reaction velocity, particularly in the later stages of the reaction. The lowest proportion of the addition of fluoride or fluorides, with which an appreciable effect is obtained, is about 0.5 per cent. by weight of the original reaction mixture; on the other hand an addition exceeding 5 per cent. by weight of the reaction mixture should be avoided since such addition would again result in impairing the reaction. Whilst beneficial results are thus obtained by additions ranging between about 0.5 and 5 per cent. by weight of the reaction mixture, it has been found that the most preferable proportion of fluorides to be added is about 2 per cent. of the original reaction mixture.

The most favorable results are obtained by the addition of cryolithe $Na_3AlF_6$. The fluorides of the alkali metals, $NaF$ and $KF$, and the fluorides of the alkaline earth metals, particularly $CaF_2$ and $MgF_2$, also exercise a favourable influence, and the use of $CaF_2$ is moreover indicated because of its cheapness. The double fluorides $Na_2SiF_6$ and $MgSiF_6$ may also be employed for the purposes of the invention.

It has further been ascertained that an addition, to the reaction mixture, of the fluorides in accordance with the present invention, when being made in conjunction with the employment of reaction mixtures in the form of briquetted moulded bodies, and particularly when such bodies contain for every 4 mols of bases (MgO or MgO+CaO) not more than 1 mol. of silicon, has the effect of reducing the reaction residue which, in the latter case, substantially consists of dicalcium silicate, to pulverulent form, whereas, in the absence of fluorides, these residues, on cooling, assume the form of more or less coarse compact lumps. The fact that it is thus possible to obtain the reaction residues in pulverulent form throughout is obviously of particular convenience in dealing with their discharge from the furnace, particularly when such discharge is to be effected from a furnace operated under reduced pressure by means of a double-valve device.

Example

In a continuously operated rotary drum furnace supplied with an atmosphere of hydrogen, a finely crushed and briquetted mixture consisting of 87.5 per cent. by weight of dolomite and 12.5 per cent. by weight of ferrosilicon (93% Si) was subjected to a temperature of 1350° C. Chemical analysis of the reaction residue which was withdrawn from the furnace in the form of coarse lumps, showed that, after a given time, 75 per cent. of the silicon employed had reacted. The same mixture having been briquetted after addition of 2 per cent. of calcium fluoride well admixed therewith, other conditions of operation, and particularly the speed of conveyance through the furnace, remaining unchanged, showed that, on the average, 95 per cent. of the silicon had reacted, and the residue, as discharged from the furnace, was of a purely pulverulent nature.

We claim:

1. A process for producing magnesium by thermal reduction of magnesiferous compounds by means of silicon, which comprises incorporating in the reaction mixture at least one substance of the group consisting of alkali, alkaline earth metal, and aluminum fluorides in quantities ranging between about 0.5 to about 5 per cent by weight of such reaction mixture, the reaction mixture being such as to yield an exclusively solid residue at the reaction temperature, and subjecting the reaction mixture thus treated to temperatures adapted to cause volatilization of the magnesium.

2. A process for producing magnesium by thermal reduction of magnesiferous compounds by means of silicon, which comprises incorporating in the reaction mixture at least one substance of the group consisting of alkali, alkaline earth metal, and aluminum fluorides in quantities of approximately 2 per cent by weight of such reaction mixture, the reaction mixture being such as to yield an exclusively solid residue at the reaction temperature, and subjecting the reaction mixture thus treated to temperatures adapted to cause volatilization of the magnesium.

3. A process for producing magnesium by thermal reduction of magnesiferous compounds by means of silicon, which comprises incorporating in the reaction mixture between about 0.5 to about 5 per cent by weight of calcium fluoride, said reaction mixture being such as to yield an exclusively solid residue at the reaction temperature, and subjecting the reaction mixture thus treated to temperatures adapted to cause volatilization of the magnesium.

4. A process for producing magnesium by thermal reduction of magnesiferous compounds by means of silicon, which comprises incorporating in the reaction mixture between about 0.5 to about 5 per cent by weight of cryolithe, said reaction mixture being such as to yield an exclusively solid residue at the reaction temperature, and subjecting the reaction mixture thus treated to temperatures adapted to cause volatilization of the magnesium.

5. A process for producing magnesium by thermal reduction of magnesiferous compounds by means of silicon, which comprises incorporating in a reaction mixture containing for every four molecules of MgO or MgO+CaO not more than one molecule of silicon, at least one substance of the group consisting of alkali, alkaline earth metal, and aluminum fluorides in quantities ranging between about 0.5 to about 5 per cent by weight of such reaction mixture, said reaction mixture being such as to yield an exclusively solid residue at the reaction temperature, and subjecting the reaction mixture thus treated to temperatures adapted to cause volatilization of the magnesium.

ROBERT SUCHY.
HELLMUTH SELIGER.

CERTIFICATE OF CORRECTION.

Patent No. 2,103,976. December 28, 1937.

ROBERT SUCHY, ET AL.

It is hereby certified that error appears in the printed specification of the above numbered patent requiring correction as follows: Page 1, first column, line 45, in the formula, for "No$_3$AlF$_6$" read Na$_3$AlF$_6$; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

in the reaction mixture at least one substance of the group consisting of alkali, alkaline earth metal, and aluminum fluorides in quantities of approximately 2 per cent by weight of such reaction mixture, the reaction mixture being such as to yield an exclusively solid residue at the reaction temperature, and subjecting the reaction mixture thus treated to temperatures adapted to cause volatilization of the magnesium.

3. A process for producing magnesium by thermal reduction of magnesiferous compounds by means of silicon, which comprises incorporating in the reaction mixture between about 0.5 to about 5 per cent by weight of calcium fluoride, said reaction mixture being such as to yield an exclusively solid residue at the reaction temperature, and subjecting the reaction mixture thus treated to temperatures adapted to cause volatilization of the magnesium.

4. A process for producing magnesium by thermal reduction of magnesiferous compounds by means of silicon, which comprises incorporating in the reaction mixture between about 0.5 to about 5 per cent by weight of cryolithe, said reaction mixture being such as to yield an exclusively solid residue at the reaction temperature, and subjecting the reaction mixture thus treated to temperatures adapted to cause volatilization of the magnesium.

5. A process for producing magnesium by thermal reduction of magnesiferous compounds by means of silicon, which comprises incorporating in a reaction mixture containing for every four molecules of MgO or MgO+CaO not more than one molecule of silicon, at least one substance of the group consisting of alkali, alkaline earth metal, and aluminum fluorides in quantities ranging between about 0.5 to about 5 per cent by weight of such reaction mixture, said reaction mixture being such as to yield an exclusively solid residue at the reaction temperature, and subjecting the reaction mixture thus treated to temperatures adapted to cause volatilization of the magnesium.

ROBERT SUCHY.
HELLMUTH SELIGER.

CERTIFICATE OF CORRECTION.

Patent No. 2,103,976.                    December 28, 1937.

ROBERT SUCHY, ET AL.

It is hereby certified that error appears in the printed specification of the above numbered patent requiring correction as follows: Page 1, first column, line 45, in the formula, for "$No_3AlF_6$" read $Na_3AlF_6$; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,103,976.                                December 28, 1937.

ROBERT SUCHY, ET AL.

It is hereby certified that error appears in the printed specification of the above numbered patent requiring correction as follows: Page 1, first column, line 45, in the formula, for "$No_3AlF_6$" read $Na_3AlF_6$; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)